United States Patent
Choi et al.

(10) Patent No.: US 10,924,751 B2
(45) Date of Patent: Feb. 16, 2021

(54) DATA UNIT AND PARAMETER SET DESIGN FOR POINT CLOUD CODING

(71) Applicant: TENCENT AMERICA LLC, Palo Alto, CA (US)

(72) Inventors: Byeongdoo Choi, Palo Alto, CA (US); Shan Liu, San Jose, CA (US); Arash Vosoughi, San Jose, CA (US); Sehoon Yea, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/808,009

(22) Filed: Mar. 3, 2020

(65) Prior Publication Data

US 2020/0304813 A1 Sep. 24, 2020

Related U.S. Application Data

(60) Provisional application No. 62/820,200, filed on Mar. 18, 2019.

(51) Int. Cl.
*H04N 19/20* (2014.01)
*H04N 19/70* (2014.01)
*H04N 19/159* (2014.01)
*H04N 19/37* (2014.01)

(52) U.S. Cl.
CPC ........... *H04N 19/20* (2014.11); *H04N 19/159* (2014.11); *H04N 19/37* (2014.11); *H04N 19/70* (2014.11)

(58) Field of Classification Search
None
See application file for complete search history.

(56) References Cited

U.S. PATENT DOCUMENTS

| 8,799,499 | B2* | 8/2014 | Brannon, Jr. | ..... H04L 29/08981 |
| | | | | 709/231 |
| 8,938,004 | B2* | 1/2015 | Boyce | .................... H04N 19/70 |
| | | | | 375/240.12 |
| 9,036,630 | B2* | 5/2015 | Hwang | ................. H04L 47/724 |
| | | | | 370/389 |
| 9,270,989 | B2* | 2/2016 | Hannuksela | ......... H04N 19/187 |
| 10,070,125 | B2* | 9/2018 | Hannuksela | ........... H04N 19/42 |
| 10,616,573 | B2* | 4/2020 | Ugur | ..................... H04N 19/70 |

(Continued)

OTHER PUBLICATIONS

Mekuria et al., "Design, Implementation and Evaluation of a Point Cloud Codec for Tele-Immersive Video," IEEE Trans. on Circuits and Systems for Video Technology, vol. 27, No. 4, Apr. 2017, pp. 828-842 (Year: 2017).*

(Continued)

*Primary Examiner* — Reza Aghevli
(74) *Attorney, Agent, or Firm* — Sughrue Mion, PLLC

(57) ABSTRACT

A method and apparatus for referencing a parameter set to permit decoding of a coded point cloud sequence includes parsing a parameter set associated with the coded point cloud sequence. A dependent parameter set is identified based on parsing the parameter set. It is identified whether the dependent parameter set is a patch-level parameter set. The patch-level parameter set is referenced based on identifying that the dependent parameter set is the patch-level parameter set to permit the decoding of the coded point cloud sequence. A frame-level parameter set is referenced based on identifying that the dependent parameter set is not the patch-level parameter set to permit the decoding of the coded point cloud sequence.

20 Claims, 6 Drawing Sheets

(56) References Cited

U.S. PATENT DOCUMENTS

| | | | |
|---|---|---|---|
| 10,708,611 B2* | 7/2020 | Deshpande | H04N 21/4884 |
| 2012/0275517 A1* | 11/2012 | Boyce | H04N 19/30 |
| | | | 375/240.12 |
| 2014/0003489 A1* | 1/2014 | Hannuksela | H04N 19/70 |
| | | | 375/240.02 |
| 2014/0219346 A1* | 8/2014 | Ugur | H04N 19/46 |
| | | | 375/240.12 |
| 2015/0078456 A1* | 3/2015 | Hannuksela | H04N 19/42 |
| | | | 375/240.25 |
| 2015/0208095 A1* | 7/2015 | Schierl | H04N 21/23432 |
| | | | 375/240.28 |
| 2015/0304667 A1* | 10/2015 | Suehring | H04N 19/174 |
| | | | 375/240.02 |

OTHER PUBLICATIONS

Lii et al., Patch=Based Video Processing: A Vibrational Baysian Approach, IEEE Trans. on Circuits and Systems for Video Technology, vol. 19, No. 1, Apr. 2009, pp. 27-40 (Year: 2009).*

Mekuria et al. "Design, implementation, and evaluation of a point cloud codec for tele-immersive video." In: IEEE Transactions on Circuits and Systems for Video Technology 27.4. Mar. 16, 2016(Mar. 16, 2016) Retrieved on May 11, 2020 (May 11, 2020) from <https://www.google.com/url?sa=t&rct=j&g=&esrc=s&source=web8icd=2&cad=rja&uact=8&ved=2ahUKEwi_rd3L-azpAhUCQq0KHQcwCz4QFjABegQIAxAB&url=https%3A%2F%2Fir.cwi.nl%2Fpub%2F24395%2F24395A.pdf&usg=AOvVaw2yojbdOljbyLVRSnaLS8VI> (15 pages total).

Li et al. "Patch-based video processing: A variational Bayesian approach." In: Transactions on Circuits and Systems for Video Technology 19.1. Sep. 23, 2008 (Sep. 23, 2008) Retrieved on May 11, 2020 (May 11, 2020) from http://citeseerx.ist.psu.edu/view/doc/download?doi=10.1.1.140.9110&rep=rep1&type=pdf (14 pages total).

International Search Report and Written Opinion dated Jun. 17, 2020, from the International Searching Authority in International Application No. PCT/US2020/022579.

* cited by examiner

FIG. 3    Streaming System 300

FIG. 5        Encoder 303

Computer System 600

DATA UNIT AND PARAMETER SET DESIGN FOR POINT CLOUD CODING

CROSS-REFERENCE TO RELATED APPLICATIONS

This application claims priority under 35 U.S.C. § 119 to U.S. Provisional Application No. 62/820,200 filed Mar. 18, 2019 in the United States Patent & Trademark Office, which is hereby incorporated by reference herein in its entirety.

FIELD

The present disclosure is directed to, among other things, point cloud coding.

BACKGROUND

Point clouds may refer to large data sets that describe three dimensional points associated with additional information such as distance, color, etc. Additionally, point clouds can be created at high rates and therefore occupy a significant amount of memory resources. In some cases, point clouds are required to be stored or transmitted over rate-limited communication channels. Accordingly, compression techniques for point clouds are advantageous in terms of resource consumption, bandwidth consumption, network metrics, etc.

SUMMARY

According to an aspect of the disclosure, a method for activating a parameter set to permit decoding of a coded point cloud sequence, the method includes parsing a parameter set associated with the coded point cloud sequence; identifying a dependent parameter set based on parsing the parameter set; identifying whether the dependent parameter set is a patch-level parameter set; and activating the patch-level parameter set based on identifying that the dependent parameter set is the patch-level parameter set to permit the decoding of the coded point cloud sequence; or activating a frame-level parameter set based on identifying that the dependent parameter set is not the patch-level parameter set to permit the decoding of the coded point cloud sequence.

According to an aspect of the disclosure, a device for activating a parameter set to permit decoding of a coded point cloud sequence, includes at least one memory configured to store program code; and at least one processor configured to read the program code and operate as instructed by the program code, the program code includes parsing code configured to cause the at least one processor to parse a parameter set associated with the coded point cloud sequence; identifying code configured to cause the at least one processor to identify a dependent parameter set based on parsing the parameter set, and identify whether the dependent parameter set is a patch-level parameter set; referencing code configured to cause the at least one processor to reference the patch-level parameter set based on identifying that the dependent parameter set is the patch-level parameter set, and reference a frame-level parameter set based on identifying that the dependent parameter set is not the patch-level parameter set to permit the decoding of the coded point cloud sequence.

According to an aspect of the disclosure, a non-transitory computer-readable medium storing instructions, the instructions comprising: one or more instructions that, when executed by one or more processors of a device, cause the one or more processors to parse a parameter set associated with a coded point cloud sequence; identify a dependent parameter set based on parsing the parameter set; identify whether the dependent parameter set is a patch-level parameter set; reference the patch-level parameter set based on identifying that the dependent parameter set is the patch-level parameter set to permit the decoding of the coded point cloud sequence; and reference a frame-level parameter set based on identifying that the dependent parameter set is not the patch-level parameter set to permit the decoding of the coded point cloud sequence.

BRIEF DESCRIPTION OF THE DRAWINGS

Further features, the nature, and various advantages of the disclosed subject matter will be more apparent from the following detailed description and the accompanying drawings in which.

PROBLEM TO BE SOLVED

Figure 1:
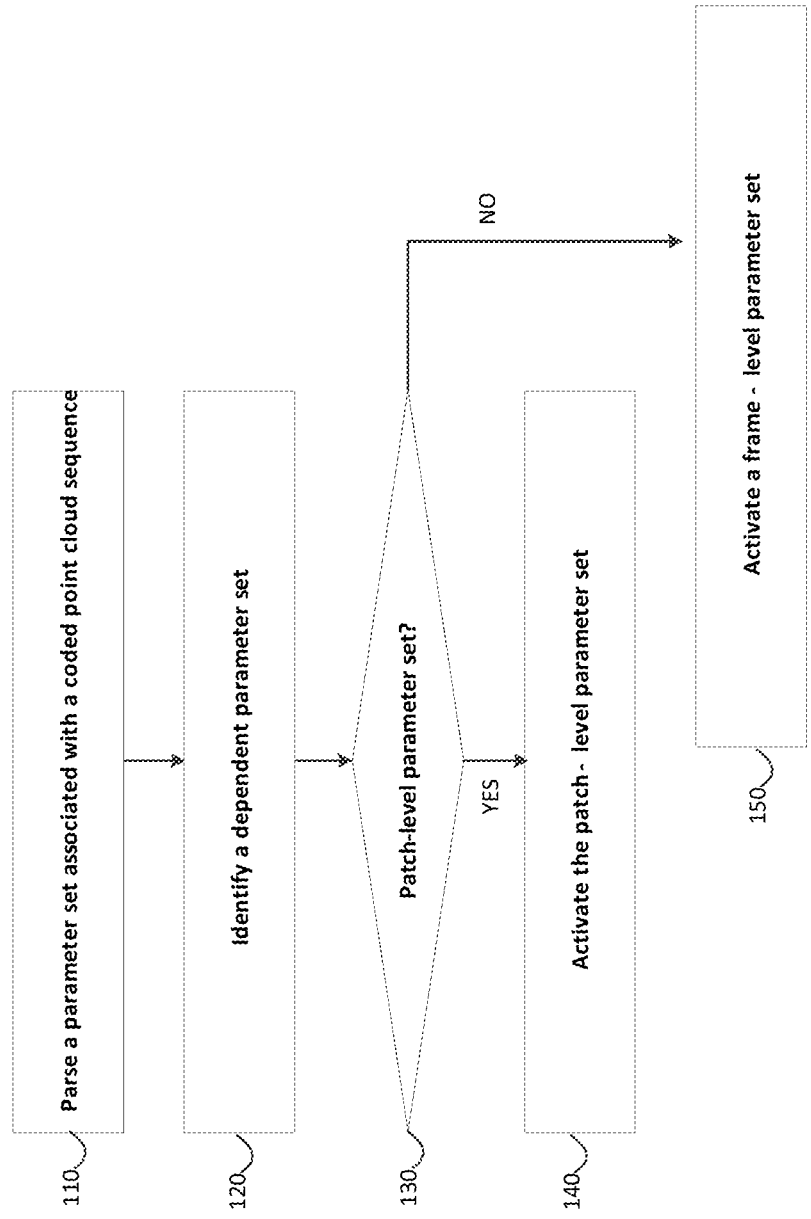
FIG. 1 is a flowchart of an example process according to an embodiment of the disclosure.

The present disclosure permits more efficient coding and decoding of point clouds.

DETAILED DESCRIPTION

Embodiments of the present disclosure propose, among other things, the following video-based point cloud compression (V-PCC) high level syntax (HLS) improvements: definition of V-PCC unit, V-PCC video data unit, and V-PCC non-video data unit; encapsulation and carriage methods of video coding layer (VCL) network abstraction layer (NAL) units and non-VCL NAL units of coded video sequences of each attribute, geometry or occupancy, in V-PCC units of a coded point cloud sequence; order and activation process of parameter sets; parameter set extension mechanisms, and other features.

According to an embodiment of the disclosure, the sequence parameter set (SPS) in V-PCC CD text may be referred to as a V-PCC sequence parameter set (VSPS), to distinguish it from the SPS of the coded video streams of attributes, geometry, and occupancy This disclosure proposes V-PCC unit and parameter set designs for V-PCC HLS. In the current V-PCC CD study text, it is not clear as to how to carry VCL-NAL units and non-VCL NAL units (e.g., sequence parameter set and picture parameter set) of the coded video streams for attributes, geometry and occupancy, and how to activate and/or reference the parameters of V-PCC (e.g., V-PCC sequence parameter set, frame parameter set, geometry parameter set, and occupancy parameter set).

According to an embodiment of the disclosure, the terms "V-PCC unit," "V-PCC video data unit (VDU)" and "V-PCC non-video data unit (NDU)" may be used as follows. A "V-PCC unit" may refer to a V-PCC video data unit (VDU) or a V-PCC non-video data unit (NDU). A "V-PCC unit" may refer to a syntax structure containing an indication of the type of data to follow and bytes containing that data. A "V-PCC non-video data unit (NDU)" may refer to a V-PCC unit containing parameter sets or metadata. A "V-PCC video data unit (VDU)" may refer to a V-PCC unit containing coded video data (e.g., VCL NAL units), coded by a video coding standard (e.g., AVC or HEVC). In this way, a VDU and an NDU include similar roles of a VCL NAL and non-VCL NAL units, respectively.

V-PCC Unit Types

| vpcc_unit_type | Identifier | V-PCC Unit Type | Description | Class |
|---|---|---|---|---|
| 0 | VPCC_VPS | V-PCC Sequence parameter set | Sequence level parameters of a CPCS | NDU |
| 1 | VPCC_SPS | Sequence parameter sets | Sequence level parameters of CVSs | NDU |
| 2 | VPCC_PPS | Picture parameter sets | Picture level parameters of CVSs | NDU |
| 3 | VPCC_PSD | Patch Sequence Data | Patch sequence information | NDU |
| 4 | VPCC_OVD | Occupancy Video Data | Occupancy information | VDU |
| 5 | VPCC_GVD | Geometry Video Data | Geometry information | VDU |
| 6 | VPCC_AVD | Attribute Video Data | Attribute information | VDU |
| 7 . . . 31 | VPCC_RSVD | Reserved | — | |

The present disclosure provides the following encapsulation and carriage methods of VCL/non-VCL NAL units.

NDU carries the parameter sets and metadata specified by V-PCC and non-VCL NAL units specified by other video coding standards (e.g., AVC or HEVC). A VDU may contain one or more VCL NAL units which belongs to the same frame. An NDU with "vpcc_unit_type" equal to 1 may contain one or more SPS raw byte sequence payloads (RBSPs) for occupancy, geometry, or attributes. An NDU with "vpcc_unit_type" equal to 3 may contain one or more PPS RBSPs for occupancy, geometry, or attributes.

TABLE 1

Video Data Unit (VDU) Syntax

| | Descriptor |
|---|---|
| video_data_unit( ) { | |
|   vdu_frame_parameter_set_id | u(8) |
|   num_vcl_nal_units | u(8) |
|   for(i = 0; i < num_vcl_nal_unist; i++) | |
|     nal_unit( ) // VCL NAL units defined by a video coding standard, out of this specification | |
|   byte_alignment( ) | |
| } | |

TABLE 2

Sequence Parameter Sets (SPS) Syntax

| | Descriptor |
|---|---|
| seq_parameter_sets ( ) { | |
|   sps_occupancy_present_flag | u(1) |
|   if(sps_occupancy_present_flag) { | |
|     sps_occupancy_parameter_set_id | u(8) |
|     seq_parameter_set_rbsp( ) | |
|   } | |
|   sps_geometry_present_flag | u(1) |
|   if(sps_geometry_present_flag) | |
|     gps_geometry_parameter_set_id | u(8) |
|   num_sps | u(8) |
|   for( i = 0; i < num_sps; i++) { | |
|     sps_attribute_type_id[ i ] | u(4) |
|     sps_attribute_index[ i ] | u(7) |
|     sps_seq_parameter_set_id | u(8) |
|     seq_parameter_set_rbsp( ) | |
|   } | |
|   byte_alignment( ) | |
| } | |

TABLE 3

Picture Parameter Sets (PPS) Syntax

| | Descriptor |
|---|---|
| pic_parameter_sets ( ) { | |
|   num_pps | u(8) |
|   for( i = 0; i < num_pps; i++ ) { | |
|     pic_attribute_type_id[ i ] | u(4) |
|     pic_attribute_index[ i ] | u(7) |
|     pps_seq_parameter_set_id | u(8) |
|     pps_pic_parameter_set_id | u(8) |
|     pic_parameter_set_rbsp( ) | |
|   } | |
|   byte_alignment( ) | |
| } | |

FIG. 1 is a flowchart of an example process according to an embodiment of the disclosure. For example, FIG. 1 is a flowchart for parameter set parsing and activation.

As shown in FIG. 1, a process of the present disclosure may include parsing a parameter set associated with a coded point cloud sequence (block 110). As further shown in FIG. 1, the process may include identifying a dependent parameter set (block 12). As further shown in FIG. 1, the process may include identifying whether the dependent parameter set is a patch-level parameter set (block 130). If the dependent parameter set is a patch-level parameter set (block 130—YES), then the process may include activating the patch-level parameter set (block 140). If the dependent parameter set is not a patch-level parameter set, then the process may include activating a frame-level parameter set (block 150).

In the V-PCC unit level, a frame parameter set (FPS) is re-employed to be used for activating VSPS, SPS, PPSs, and other parameter sets in V-PCC unit level. Potentially, the FPS may contain the frame-level partitioning information (e.g., Tile). The frame parameter set (FPS) is activated by a V-PCC video data unit (VDU) and referred to by one or more VDUs.

In the V-PCC unit level, a V-PCC sequence parameter set (VSPS) is activated by an FPS and referred to by one or more FPS. An activated VSPS shall remain active for the entire coded point cloud sequence (CPCS).

In the V-PCC unit level, a picture parameter set (PPS) of a coded video sequence (CVS) is activated by an FPS and referred to by one or more FPSs and VCL NAL units in the same CVS.

In the V-PCC unit level, a sequence parameter set (SPS) of a CVS activated by an PPS in the same CVS and referred to by one or more FPSs and VCL NAL units in the same CVS.

In the V-PCC unit level, and if necessary, occupancy parameter set (OPS) and geometry parameter set (GPS) are activated by an FPS.

In a patch sequence level, patch-level parameter sets (e.g., an attribute patch parameter set, a geometry patch parameter set, or the like) and a patch frame parameter are activated by a "patch_frame_layer_unit" and are referred to by one or more "patch_frame_layer_units," respectively.

In a patch sequence level, the geometry frame parameter set is activated by a geometry patch parameter set and referenced by one or more geometry patch parameter sets.

In a patch sequence level, an attribute frame parameter set is activated by an attribute patch parameter set and referenced by one or more attribute patch parameter sets.

In a patch sequence level, a patch sequence parameter set (PSPS) is activated by a patch frame parameter, geometry frame parameter, or attribute patch parameter set. An activated PSPS shall remain active for the entire coded point cloud sequence (CPCS).

TABLE 4

Frame Parameter Set (FPS) Syntax

| | Descriptor |
|---|---|
| frame_parameter_set ( ) { | |
|   fps_vpcc_seq_parameter_set_id | u(8) |
|   fps_seq_parameter_sets_id | u(8) |
|   fps_occupancy_present_flag | u(1) |
|   if(fps_occupancy_present_flag) | |
|     fps_occupancy_parameter_set_id | u(8) |
|   fps_geometry_present_flag | u(1) |
|   if(fps_geometry_present_flag) | |
|     fps_geometry_parameter_set_id | u(8) |
|   fps_num_attribute | u(8) |
|   for( i = 0; i < fps_num_attribute; i++ ) { | |
|     fps_attribute_type[ i ] | u(4) |
|     fps_attribute_index[ i ] | u(7) |
|     fps_attribute_parameter_set_id[ i ] | u(8) |
|     fps_pic_parameter_set_id[ i ] | u(8) |
|   } | |
|   byte_alignment( ) | |
| } | |

This clause specifies the activation process of V-PCC sequence parameter sets (VSPSs), sequence parameter sets (SPSs), frame parameter set (FPSs), picture parameter sets (PPSs), occupancy parameter sets (OPSs), geometry parameter sets (GPSs) and attribute parameter set (APSs).

The VSPS, SPS, FPS, PPS, OPS, GPS and APS mechanism decouples the transmission of infrequently changing information from the transmission of coded video data. The parameters may, in some applications, be conveyed "out-of-band."

An FPS includes parameters that can be referred to by a V-PCC video data unit. Each FPS is initially considered not active at the start of the operation of the decoding process. At most, one FPS is considered active at any given moment during the operation of the decoding process, and the activation of any particular PPS results in the deactivation of the previously-active FPS. When an FPS (with a particular value of "fps_frame_parameter_set_id") is not active and is referred to by a V-PCC video unit (using a value of "vdu_frameparameter_set_id" equal to the "fps_frame_parameter_set_id" value), it is activated for the frame. This FPS is called the active FPS until it is deactivated by the activation of another FPS for another frame. An FPS, with that particular value of "fps_frame_parameter_set_id," shall be available to the decoding process prior to its activation, included in V-PCC non-video data unit or provided through external means. Any FPS NAL unit containing the value of "fps_frame_parameter_set_id" for the active FPS for a coded frame shall have the same content as that of the active FPS for the coded frame, unless it follows the last V-PCC video unit of the coded frame and precedes the first V-PCC video unit of another coded frame.

An VSPS RBSP includes parameters that can be referred to by one or more FPSs. Each VSPS is initially considered not active at the start of the operation of the decoding process. At most, one VSPS is considered active at any given moment during the operation of the decoding process, and the activation of any particular VSPS results in the deactivation of the previously-active VSPS.

When a VSPS (with a particular value of "vsps_vpcc_seqparameter_set_id") is not already active and it is referred to by activation of a FPS (in which "fps_vpcc_seqparameter_set_id" is equal to the "vsps_vpcc_seqparameter_set_id value"), it is activated. This VSPS is called the active VSPS until it is deactivated by the activation of another VSPS. A VSPS, with that particular value of "vsps_vpcc_seqparameter_set_id," shall be available to the decoding process prior to its activation, included in at least one V-PCC non-video unit or provided through external means. An activated VSPS shall remain active for the entire coded point cloud sequence (CPCS).

A V-PCC non-video data unit with "vpcc_unit_type" equal to 3 contains one or more "pps_pic_parameter_set_ids" and the corresponding one or more PPS NAL units. The value of a "pps_pic_parameter_set_id[i]" is equal to that of the i-th PPS NAL unit included in the V-PCC non-video data unit. A PPS includes parameters that can be referred to by one or more FPSs. Each PPS is initially considered not active at the start of the operation of the decoding process.

At most, one PPS is considered active at any given moment during the operation of the decoding process, and the activation of any particular PPS results in the deactivation of the previously-active PPS. When a FPS is active, and the i-th PPS associated with particular values of "pps_attribute_type[i]" and "pps_attribute_index[i]" included in the V-PCC non-video data unit with "vpcc_unit_type" equal to 3 is referred to by the FPS (in which the values of "fps_attribute_type[j]," "fps_attribute_index[j]," "fps_pic_parameter set id[j]" are equal to those of "pps_attribute_type[i]," "pps_attribute_index[i]," "pps_pic_parameter_set_id[i])," the i-th PPS is activated for V-PCC video data units for the frame. This PPS is called the active PPS until it is deactivated by the activation of another PPS for another frame. A PPS, with that particular value of "pps_pic_parameter_set_id," shall be available to the decoding process prior to its activation, included in V-PCC non-video data unit or provided through external means. Any PPS NAL unit containing the value of "pps_pic_parameter set id" for the active PPS for a coded frame shall have the same content as that of the active PPS for the coded frame, unless it follows the last V-PCC video unit of the coded frame and precedes the first V-PCC video unit of another coded frame.

A V-PCC non-video data unit with "vpcc_unit_type" equal to 1 contains one or more "sps_pic_parameter set ids" and the corresponding one or more SPS NAL units. The value of a "sps_seq_parameter set id[i]" is equal to that of the i-th SPS NAL unit included in the V-PCC non-video data unit. An SPS includes parameters that can be referred to by one or more PPSs contained in a V-PCC non-video data unit with "vpcc_unit_type" equal to 1. Each SPS is initially considered not active at the start of the operation of the decoding process. At most, one SPS is considered active at any given moment during the operation of the decoding process, and the activation of any particular SPS results in the deactivation of the previously-active SPS. When an SPS (with a particular value of "sps_seq_parameter set id") is not already active and it is referred to by activation of a PPS (in which "pps seq_parameter set id" is equal to the "sps_seq_parameter_set_id" value), it is activated. This SPS is called the active SPS until it is deactivated by the activation of another SPS. An SPS, with that particular value of "sps_seq_parameter_set_id," shall be available to the decoding process prior to its activation, included in at least one V-PCC non-video data unit or provided through external means. An activated SPS shall remain active for the entire coded point cloud sequence (CPCS). Any SPS NAL unit containing the value of "sps_seq_parameter_set_id" for the active SPS for a CPCS shall have the same content as that of the active SPS for the CVS, unless it follows the last access unit of the CPCS and precedes the first VCL NAL unit of another CPCS.

An APS RB SP includes parameters that can be referred to by one or more FPSs. Each APS is initially considered not active at the start of the operation of the decoding process. At most one APS is considered active at any given moment during the operation of the decoding process, and the activation of any particular APS results in the deactivation of the previously-active PPS. When an FPS is active and the APS associated with particular values of "attribute type" and "attribute_index" in vpcc unit header is referred to by the FPS (in which the values of "fps_attribute_type[j]," "fps_attribute_index[j]" and "fps_attribute_parameter_set_id[j]" are equal to those of "attribute type," "attribute_index," "aps_attribute_parameter_set_id"), the APS is activated. This APS is called the active APS until it is deactivated by the activation of another APS. An APS, with that a particular value of "aps_attribute_parameter_set_id," shall be available to the decoding process prior to its activation, included in V-PCC non-video data unit or provided through external means. Any APS V-PCC non-video unit containing the value of "aps_attribute_parameter_set_id" for the active APS for a coded frame shall have the same content as that of the active APS for the coded frame, unless it follows the last V-PCC video unit of the coded frame and precedes the first V-PCC video unit of another coded frame.

An OPS RB SP includes parameters that can be referred to by one or more FPSs. Each OPS is initially considered not active at the start of the operation of the decoding process. At most one OPS is considered active at any given moment during the operation of the decoding process, and the activation of any particular OPS results in the deactivation of the previously-active OPS. When an FPS is active and the OPS is referred to by the FPS (in which the values of "fps_occupancy_parameter_set_id" is equal to that of "ops_occupancy_parameter_set_id"), the OPS is activated. This OPS is called the active OPS until it is deactivated by the activation of another OPS. An OPS, with that a particular value of "ops_occupancy_parameter_set_id," shall be available to the decoding process prior to its activation, included in V-PCC non-video data unit or provided through external means. Any OPS V-PCC non-video unit containing the value of "ops_occupancy_parameter_set_id" for the active OPS for a coded frame shall have the same content as that of the active OPS for the coded frame, unless it follows the last V-PCC video unit of the coded frame and precedes the first V-PCC video unit of another coded frame.

An GPS RB SP includes parameters that can be referred to by one or more FPSs. Each GPS is initially considered not active at the start of the operation of the decoding process. At most one GPS is considered active at any given moment during the operation of the decoding process, and the activation of any particular GPS results in the deactivation of the previously-active GPS. When an FPS is active and the GPS is referred to by the FPS (in which the values of "fps_geometry_parameter_set_id" is equal to that of "gps_geometry_parameter_set_id"), the GPS is activated. This GPS is called the active GPS until it is deactivated by the activation of another GPS. An GPS, with that a particular value of "gps_geometry_parameter_set_id," shall be available to the decoding process prior to its activation, included in V-PCC non-video data unit or provided through external means. Any GPS V-PCC non-video unit containing the value of "gps_geometry_parameter_set_id" for the active GPS for a coded frame shall have the same content as that of the active GPS for the coded frame, unless it follows the last V-PCC video unit of the coded frame and precedes the first V-PCC video unit of another coded frame.

An embodiment of the disclosure includes an extension syntax appended to various parameter set syntax, similar to that of HEVC. An embodiment includes a codec-specific extension to carry codec-dependent parameters as shown in Table 5 below.

TABLE 5

| | |
|---|---|
| vsps_extension_present_flag | u(1) |
| if( vsps_extension_present_flag ) { | |
|    avc_specific_extension_flag | u(1) |
|    hevc_specific_extension_flag | u(1) |
|    vvc_specific_extension_flag | u(1) |
|    vsps_extension_5bits | u(1) |
| } | |
| if( avc_specific_extension_flag ) | |
|    avc_specfic_extension( ) | |
| if( hevc_specific_extension_flag ) | |
|    hevc_specfic_extension() | |
| if( vvc_specific_extension_flag ) | |
|    vvc_specfic_extension( ) | |
| if(vsps_extension_5bits) | |
|    while( more_parameter_data( ) ) | |
|       vsps_extension_data_flag | u(1) |
| ... | |

According to an embodiment, "more_rbsp_data ( )" is specified as follows: if there is no more data in the parameter set, then the return value "more_rbsp_data ( )" is equal to FALSE.

Otherwise, the RBSP data are searched for the last (least significant, right-most) bit equal to 1 that is present in the. Given the position of this bit, which is the first bit (rbsp_stop_one_bit) of the rbsp_trailing_bits( ) syntax structure, the following applies: if there is more data in an RBSP before the rbsp_trailing_bits( ) syntax structure, then the return value of "more_rbsp_data( )" is equal to TRUE. Otherwise, the return value of more_rbsp_data ( ) is equal to FALSE.

Figure 2:
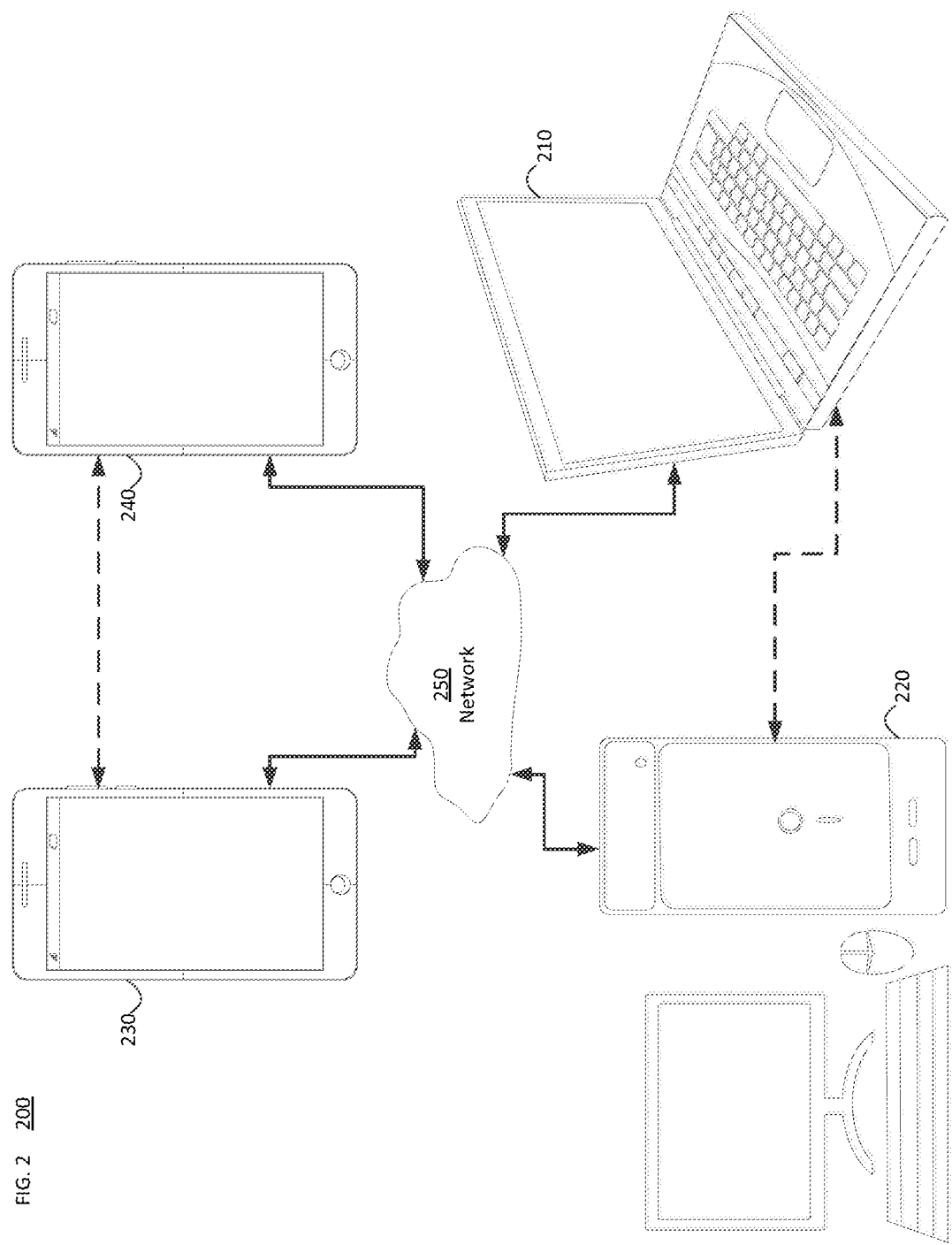
FIG. 2 is a schematic illustration of a simplified block diagram of a communication system in accordance with an embodiment.

FIG. 2 illustrates a simplified block diagram of a communication system (200) according to an embodiment of the present disclosure. The system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
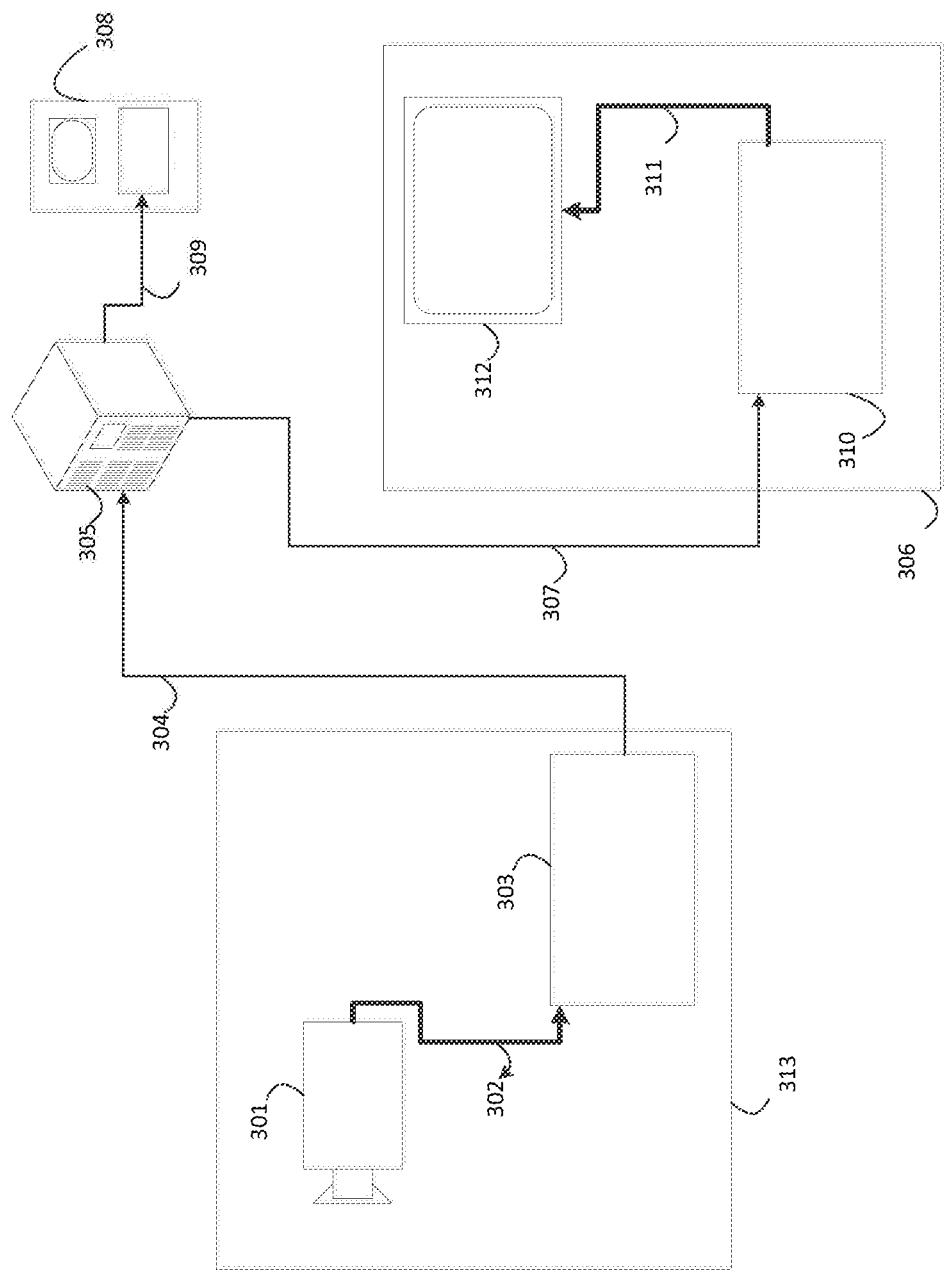
FIG. 3 is a schematic illustration of a simplified block diagram of a communication system in accordance with an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating a for example uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 4:
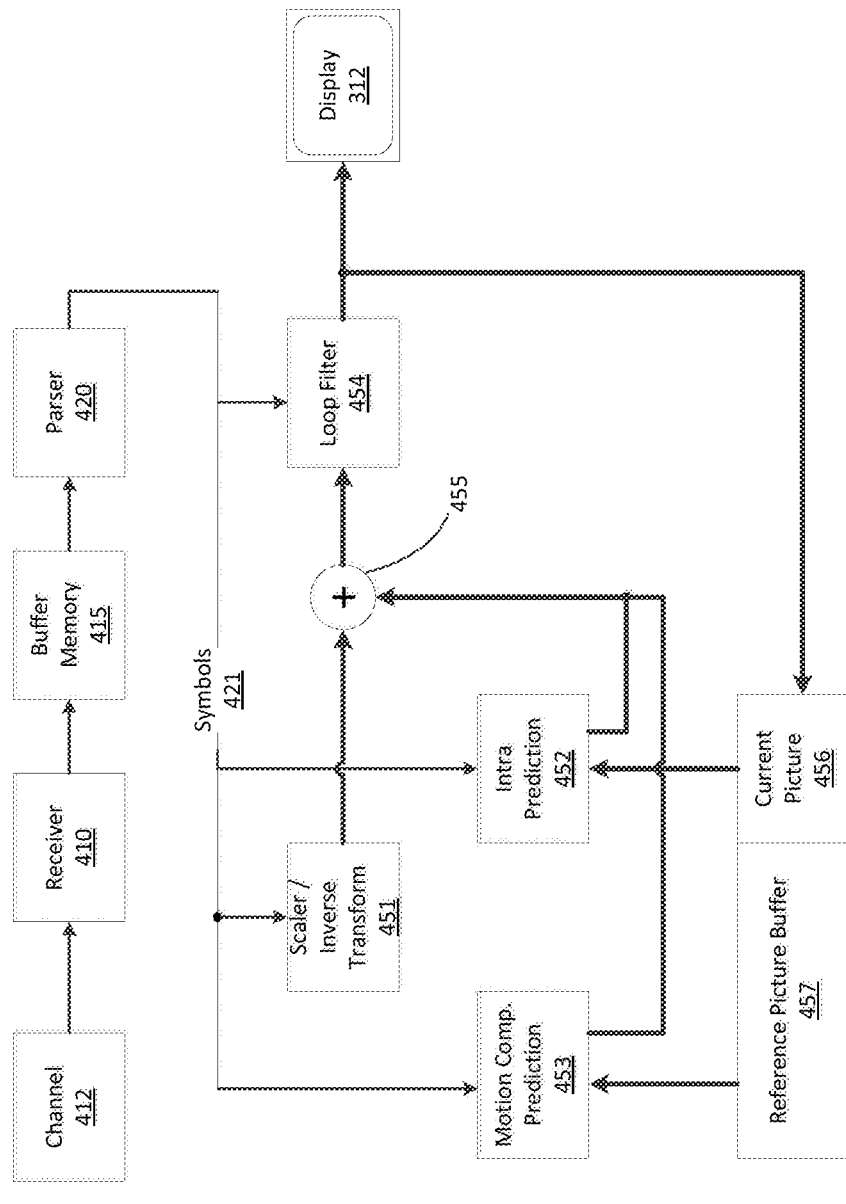
FIG. 4 is a schematic illustration of a simplified block diagram of a decoder in accordance with an embodiment.

FIG. 4 may be a functional block diagram of a video decoder (310) according to an embodiment of the present disclosure.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosynchronous network, the buffer (415) may not be needed, or can be small. For use on best effort packet networks such as the Internet, the buffer (415) may be required, can be comparatively large and can advantageously of adaptive size.

The video decoder (310) may include an parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (420) may perform entropy decoding/parsing operation on the video sequence received from the buffer (415), so to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder 310 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (454). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (454) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (454) can become part of the reference picture buffer (457), and a fresh current picture memory can be reallocated before commencing the reconstruction of the following coded picture.

The video decoder 420 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (420) to properly decode the data and/or to more accurately reconstruct the original video data. Additional data can be in the form of, for example, temporal, spatial, or SNR enhancement layers, redundant slices, redundant pictures, forward error correction codes, and so on.

Figure 5:
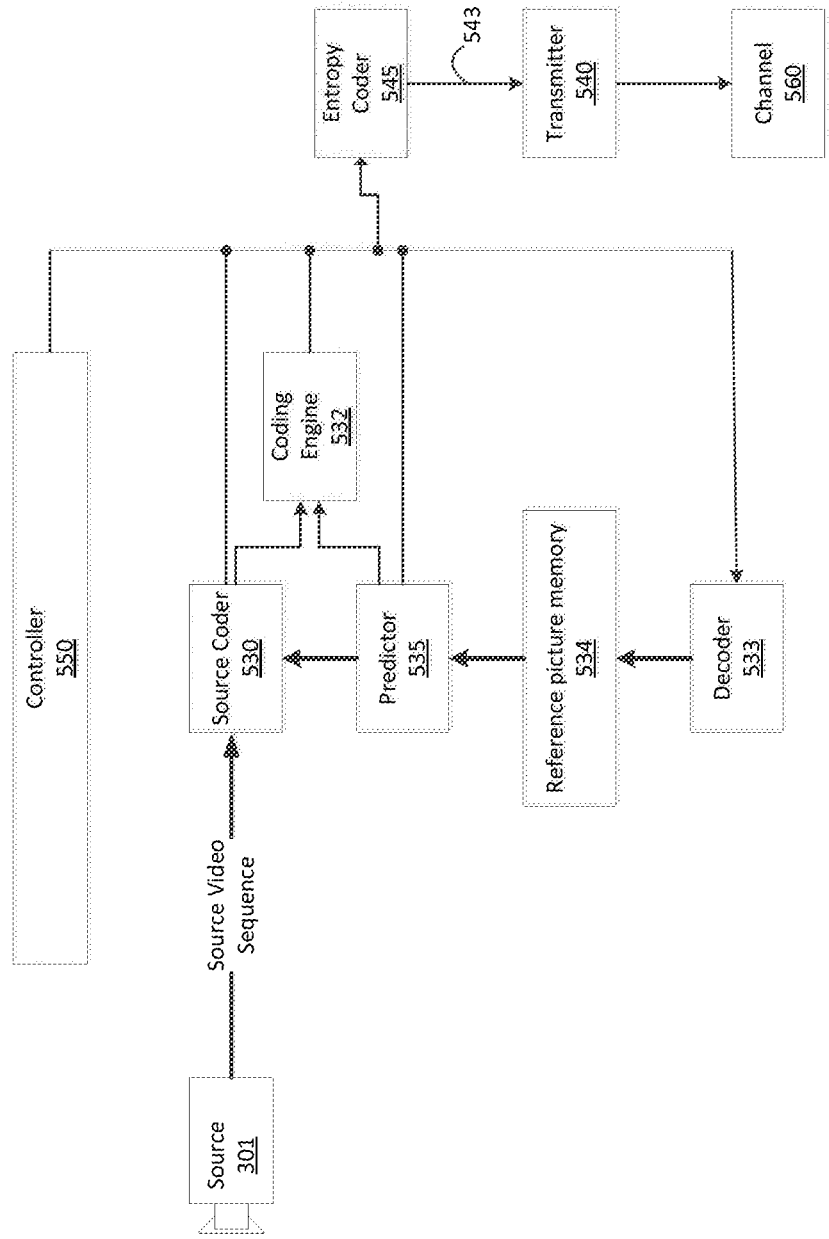
FIG. 5 is a schematic illustration of a simplified block diagram of an encoder in accordance with an embodiment.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the are readily recognizes as a "coding loop". As an over-simplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 6:
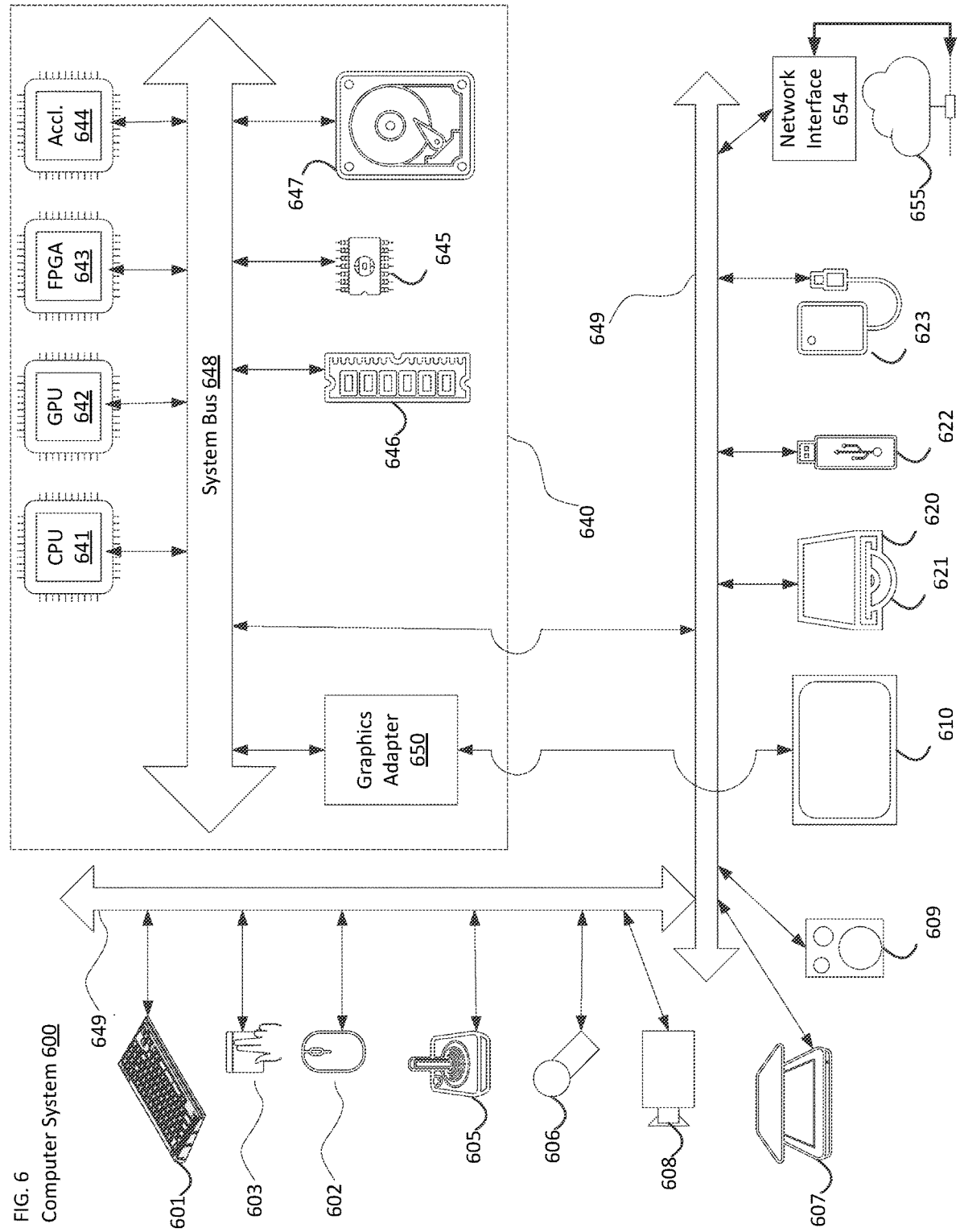
FIG. 6 is a schematic illustration of a computer system in accordance with an embodiment.

FIG. 6 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove 604, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data-glove 604, or joystick 605, but there can also be tactile feedback devices that do not serve as input devices), audio output devices (such as: speakers 609, headphones (not depicted)), visual output devices (such as screens 610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 can also include an interface to one or more communication networks (655). Networks (655) can for example be wireless, wireline, optical. Networks (655) can further be local, wide-area, metropolitan, vehicular and industrial, real-time, delay-tolerant, and so on. Examples of networks (655) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks (655) commonly require external network interface adapters (654) that are attached to certain general purpose data ports or peripheral buses (649) (such as, for example USB ports of the computer system 600; others are commonly integrated into the core of the computer system 600 by attachment to a system bus as described below (for example Ethernet interface into a PC computer system or cellular network interface into a smartphone computer system). Using any of these networks (655), computer system 600 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (655) and network interfaces (654) as described above.

Aforementioned human interface devices, human-accessible storage devices, and network interfaces (654) can be attached to a core 640 of the computer system 600.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory 646, internal mass storage such as internal non-user accessible hard drives, SSDs, and the like 647, may be connected through a system bus 648. In some computer systems, the system bus 648 can be accessible in the form of one or more physical plugs to enable extensions by additional CPUs, GPU, and the like. The peripheral devices can be attached either directly to the core's system bus 648, or through a peripheral bus 649 or graphics adapter 650. Architectures for a peripheral bus include PCI, USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 600, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for activating a parameter set to permit decoding of a coded point cloud sequence, the method comprising:
    parsing a parameter set associated with the coded point cloud sequence;
    identifying a dependent parameter set based on parsing the parameter set;
    identifying whether the dependent parameter set is a patch-level parameter set;
    referencing the patch-level parameter set based on identifying that the dependent parameter set is the patch-level parameter set to permit the decoding of the coded point cloud sequence; and
    referencing a frame-level parameter set based on identifying that the dependent parameter set is not the patch-level parameter set to permit the decoding of the coded point cloud sequence.

2. The method of claim 1, wherein the parameter set is associated with a video-based point cloud compression (V-PCC) unit.

3. The method of claim 2, wherein the V-PCC unit is a V-PCC non-video data unit (NDU).

4. The method of claim 2, wherein the V-PCC unit is a V-PCC video data unit (VDU).

5. The method of claim 1, wherein the patch-level parameter set is an attribute patch parameter set.

6. The method of claim 1, wherein the patch-level parameter set is a geometry patch parameter set.

7. The method of claim 1, wherein the parameter set is associated with a video-based point cloud compression (V-PCC) sequence parameter set (VSPS).

8. A device for referencing a parameter set to permit decoding of a coded point cloud sequence, comprising:
    at least one memory configured to store program code; and
    at least one processor configured to read the program code and operate as instructed by the program code, the program code configured to cause the at least one processor to perform:
        parsing a parameter set associated with the coded point cloud sequence;
        identifying whether a dependent parameter set is a patch-level parameter set based on parsing the parameter set;
        referencing the patch-level parameter set based on identifying that the dependent parameter set is the patch-level parameter set; and
        referencing a frame-level parameter set based on identifying that the dependent parameter set is not the patch-level parameter set to permit the decoding of the coded point cloud sequence.

9. The device of claim 8, wherein the parameter set is associated with a video-based point cloud compression (V-PCC) unit.

10. The device of claim 9, wherein the V-PCC unit is a V-PCC non-video data unit (NDU).

11. The device of claim 9, wherein the V-PCC unit is a V-PCC video data unit (VDU).

12. The device of claim 8, wherein the patch-level parameter set is an attribute patch parameter set.

13. The device of claim 8, wherein the patch-level parameter set is an attribute patch parameter set.

14. The device of claim 8, wherein the patch-level parameter set is a geometry patch parameter set.

15. A non-transitory computer-readable medium storing instructions, the instructions comprising: one or more instructions that, when executed by one or more processors of a device, cause the one or more processors to:
    parse a parameter set associated with a coded point cloud sequence;
    identify a dependent parameter set based on parsing the parameter set;
    identify whether the dependent parameter set is a patch-level parameter set;
    reference the patch-level parameter set based on identifying that the dependent parameter set is the patch-level parameter set to permit the decoding of the coded point cloud sequence; and
    reference a frame-level parameter set based on identifying that the dependent parameter set is not the patch-level parameter set to permit the decoding of the coded point cloud sequence.

16. The non-transitory computer-readable medium according to claim 15, wherein the parameter set is associated with a video-based point cloud compression (V-PCC) unit.

17. The non-transitory computer-readable medium according to claim 16, wherein the V-PCC unit is a V-PCC non-video data unit (NDU).

18. The non-transitory computer-readable medium according to claim 16, wherein the V-PCC unit is a V-PCC video data unit (VDU).

19. The non-transitory computer-readable medium according to claim 15, wherein the patch-level parameter set is an attribute patch parameter set.

20. The non-transitory computer-readable medium according to claim 15, wherein the patch-level parameter set is a geometry patch parameter set.

\* \* \* \* \*